(12) United States Patent
Yamaguchi

(10) Patent No.: US 7,997,394 B2
(45) Date of Patent: Aug. 16, 2011

(54) DAMPING FORCE ADJUSTABLE FLUID PRESSURE SHOCK ABSORBER

(75) Inventor: Hiroyuki Yamaguchi, Machida (JP)

(73) Assignee: Hitachi, Ltd., Tokyo (JP)

( * ) Notice: Subject to any disclaimer, the term of this patent is extended or adjusted under 35 U.S.C. 154(b) by 730 days.

(21) Appl. No.: 12/078,158

(22) Filed: Mar. 27, 2008

(65) Prior Publication Data
US 2008/0236966 A1 Oct. 2, 2008

(30) Foreign Application Priority Data
Mar. 30, 2007 (JP) .................................. 2007-094803

(51) Int. Cl.
*F16F 9/34* (2006.01)

(52) U.S. Cl. .................. 188/282.2; 188/266.2; 188/280; 188/322.15

(58) Field of Classification Search ............ 188/275, 188/266.2, 280, 282.2, 282.4, 282.5, 282.8, 188/313, 322.15; 251/129.01, 129.15, 129.2
See application file for complete search history.

(56) References Cited

U.S. PATENT DOCUMENTS

| | | | | |
|---|---|---|---|---|
| 4,696,379 | A | * | 9/1987 | Yamamoto et al. ......... 188/282.3 |
| 5,094,321 | A | * | 3/1992 | Neumann .................... 188/285 |
| 6,374,967 | B2 | * | 4/2002 | Matsumoto et al. ......... 188/280 |
| 6,729,446 | B2 | * | 5/2004 | Sakai et al. ................ 188/266.2 |
| 6,782,980 | B2 | * | 8/2004 | Nakadate .................... 188/313 |
| 6,860,370 | B2 | * | 3/2005 | Nakadate .................. 188/282.5 |
| 7,654,369 | B2 | * | 2/2010 | Murray et al. ............. 188/266.5 |
| 7,694,785 | B2 | * | 4/2010 | Nakadate .................. 188/266.5 |
| 7,757,826 | B2 | * | 7/2010 | Hayama et al. ............ 188/282.2 |
| 2008/0257668 | A1 | * | 10/2008 | Yamaguchi et al. .......... 188/285 |

FOREIGN PATENT DOCUMENTS

| | | |
|---|---|---|
| JP | 2003-278819 | 10/2003 |
| JP | 2006-292092 | 10/2006 |

* cited by examiner

*Primary Examiner* — Robert Siconolfi
*Assistant Examiner* — Mariano Sy
(74) *Attorney, Agent, or Firm* — Wenderoth, Lind & Ponack, L.L.P.

(57) ABSTRACT

A piston coupled to a piston rod is fitted in a sealed cylinder in which oil is contained. During an extension stroke of the piston rod, a damping force is generated by an extension-side valve body, and at the same time, a valve-opening pressure of an extension-side main valve is adjusted by an inner pressure in an extension-side backpressure chamber. During a compression stroke of the piston rod, a damping force is generated by a compression-side valve body, and at the same time, a valve-opening pressure of a compression-side main valve is adjusted by an inner pressure in a compression-side backpressure chamber. A simple structure is realized by using a common guide bore for guiding the extension-side valve body and the compression-side valve body. Check valves are provided at both ends of the guide bore and communication passage are provided through the extension-side valve body and the compression-side valve body so that an amount of excess oil due to a movement of the extension-side valve body and the compression-side valve body can be expelled, thereby improving responsiveness of the shock absorber.

20 Claims, 3 Drawing Sheets

DAMPING FORCE ADJUSTABLE FLUID PRESSURE SHOCK ABSORBER

BACKGROUND OF THE INVENTION

The present invention relates to a damping force adjustable fluid pressure shock absorber in which damping force characteristics can be appropriately adjusted.

As a hydraulic shock absorber mounted on a suspension apparatus of a vehicle such as an automobile, there is known a damping force adjustable hydraulic shock absorber in which damping force characteristics can be appropriately adjusted in accordance with road surface conditions, vehicle running conditions, and the like, so as to improve ride comfort and steering stability.

Generally, a damping force adjustable hydraulic shock absorber comprises a sealed cylinder in which oil is contained, a piston rod, and a piston coupled to the piston rod. The piston is slidably fitted in the cylinder so as to divide the inside of the cylinder into two chambers. The piston includes a primary oil passage and a bypass passage through which the two chambers in the cylinder are in communication with each other. A damping force generating mechanism is provided at the primary oil passage. The damping force generating mechanism comprises an orifice, a disk valve and the like. A damping force adjusting valve is provided at the bypass passage. The damping force adjusting valve adjusts the passage area of the bypass passage.

To reduce a damping force, the bypass passage is opened by use of the damping force adjusting valve so as to reduce resistance to an oil flow between the two chambers in the cylinder. To increase a damping force, the bypass passage is closed so as to increase resistance to an oil flow between the two chambers. In this way, damping force characteristics can be appropriately adjusted by opening or closing the damping force adjusting valve.

However, a problem exists in a hydraulic shock absorber in which damping force adjustment relies, as described above, on changing only a passage area of a bypass passage; that is, although it is possible to change damping force characteristics to a large extent in a low piston speed range because in this range a damping force depends on an orifice dimension of an oil passage, it is not possible to change damping force characteristics to a large extent in middle and high piston speed ranges because in these ranges a damping force depends on an opening degree of a damping force generating mechanism (for example, disk valve) provided at a primary oil passage.

With the aim of solving this problem, for example, Japanese Patent Application Public Disclosure 2003-278819 discloses a damping force adjustable hydraulic absorber provided with a pilot type damping force adjusting valve as a damping force generating mechanism on a primary oil passage. In the pilot type damping force adjusting valve, a backpressure chamber (pilot chamber) is formed at the back of a disk valve, and the backpressure chamber is in communication through a fixed orifice with a cylinder chamber of an upstream side of the disk valve, and is also in communication through a flow rate control valve (pilot control valve) with a cylinder chamber of a downstream side of the disk valve.

According to this damping force adjustable hydraulic absorber, the area of the communication passage between the two chambers in the cylinder can be directly adjusted by opening or closing the flow rate control valve, and at the same time, the valve-opening pressure of the disk valve can be changed by changing the pressure in the backpressure chamber by utilizing pressure loss occurring at the flow rate control valve. In this way, it is possible to adjust not only orifice characteristics (in which a damping force is approximately proportional to the square of piston speed) but also valve characteristics (in which a damping force is approximately proportional to piston speed), thereby to widen an adjustable range of damping force.

As a further improved art, for example, Japanese Patent Application Public Disclosure 2006-292092 discloses a damping force adjustable hydraulic shock absorber in which a simple structure is realized by partially sharing an oil flow passage between an extension side and a compression side, and using a single damping force adjusting valve to adjust respective damping forces of the extension and compression sides.

However, the damping force adjustable hydraulic shock absorber disclosed in the above mentioned Japanese Patent Application Public Disclosure 2006-292092 has the following problem. Namely, since a valve body of the damping force adjusting valve (solenoid valve) includes pressure receiving surfaces on its end portion, it is not possible to form a passage through the valve body, through which chambers at both ends of the body could otherwise communicate with each other and thereby provide a pressure balance. Consequently, it is difficult to adequately recover a volume loss caused by a movement of the valve body, as a result of which smooth opening and closing of the valve is liable to be impeded, and responsiveness of the hydraulic shock absorber is liable to deteriorate.

SUMMARY OF THE INVENTION

The present invention has been contrived in consideration of the above-mentioned problem, and an object thereof is to provide a damping force adjustable fluid pressure shock absorber in which a pilot type damping force valve is provided on each of an extension side and a compression side, and a simple structure and excellent responsiveness is realized.

The present invention provides a damping force adjustable fluid pressure shock absorber, comprising:
a cylinder in which a fluid is sealingly contained;
a piston slidably fitted in the cylinder so as to divide an inside of the cylinder into two chambers;
a piston rod coupled to the piston and extending to an outside of the cylinder;
an extension-side flow passage and a compression-side flow passage through which the two chambers in the cylinder are in communication with each other; and
a damping force generating mechanism for generating a damping force by controlling fluid flows in the extension-side flow passage and the compression-side flow passage,
wherein the damping force generating mechanism comprises
an extension-side main valve provided at the extension-side flow passage,
an extension-side backpressure chamber for adjusting a valve-opening pressure of the extension-side main valve,
an extension-side bypass flow passage through which the two chambers in the cylinder are in communication with each other,
an extension-side pressure control valve provided at the extension-side bypass flow passage and adapted to be opened by receiving a pressure in the extension-side bypass flow passage,
a compression-side main valve provided at the compression-side flow passage,
a compression-side backpressure chamber for adjusting a valve-opening pressure of the compression-side main valve, a compression-side bypass flow passage through which the two chambers in the cylinder are in communication with each other, and a compression-side pressure control valve provided at the compression-side bypass flow passage and adapted to be opened by receiving a pressure in the compression-side bypass flow passage, the extension-side bypass flow passage introducing a pressure of an upstream side of the extension-side pressure control valve into the extension-side backpressure chamber, the compression-side bypass flow passage introducing a pressure of an upstream side of the compression-side pressure control valve into the compression-side backpressure chamber, the extension-side pressure control valve and the compression-side pressure control valve comprising a guide bore shared by the two valves, the guide bore having one end in communication with one of the two chambers in the cylinder and an opposite end in communication with the other of the two chambers in the cylinder, a first valve body slidably fitted in the guide bore, and adapted to be seated on a seat surface provided in the guide bore and to be opened by receiving a pressure in one of the extension-side bypass flow passage and the compression-side bypass flow passage, a second valve body slidably fitted in the guide bore, and adapted to be seated on a seat surface provided at the first valve body and to be opened by receiving a pressure in the other of the extension-side bypass flow passage and the compression-side bypass flow passage, a damping force adjuster for adjusting valve-opening pressures of the first valve body and the second valve body by biasing the first valve body and the second valve body in valve-closing directions thereof, a first check valve provided at the one end of the guide bore, and allowing only a fluid flow from one end side of the first valve body and the second valve body to one of the two chambers in the cylinder, and a second check valve provided at the opposite end of the guide bore, and allowing only a fluid flow from an opposite end side of the first valve body and the second valve body to the other of the two chambers in the cylinder, and an axially extending communication passage provided through the first valve body and the second valve body, the axially extending communication passage allowing communication between the one end side of the first valve body and the second valve body, and the opposite end side of the first valve body and the second valve body.

The damping force adjuster may comprise a proportional solenoid actuator.

The damping force adjustable fluid pressure shock absorber may further comprising a biasing unit provided between the valve bodies for biasing the first valve body and the second valve body in a direction in which the valve bodies are spaced apart from each other.

The first valve body may include a small diameter portion on one end side thereof, the small diameter portion adapted to be seated on the seat surface provided in the guide bore, and a large diameter portion on an opposite end side thereof, the large diameter portion adapted to be guided by the guide bore. The second valve body may include a small diameter portion on one end side thereof, the small diameter portion adapted to be seated on the seat surface provided at the first valve body, and a large diameter portion on an opposite end side thereof, the large diameter portion adapted to be guided by the guide bore.

The damping force adjustable fluid pressure shock absorber may further comprising a valve seat member provided in the guide bore so as to be axially movable, the valve seat member including a one end surface serving as the seat surface which abuts against the first valve body.

One of the first check valve and the second check valve may be provided in the valve seat member.

The guide bore may extend in an axial direction of the piston rod.

In a preferred embodiment of the present invention which will be described later, fluid is embodied as oil. However, it will be appreciated that this embodiment does not limit the present invention, and fluid in the present invention may be any fluid such as a gas or others. The term "fluid" in the accompanying claims is used to denote a concept encompassing any kind of fluid.

DETAILED DESCRIPTION OF THE PREFERRED EMBODIMENTS

Hereinbelow, an embodiment of the present invention will be described in detail with reference to the accompanying drawings.

Figure 1:
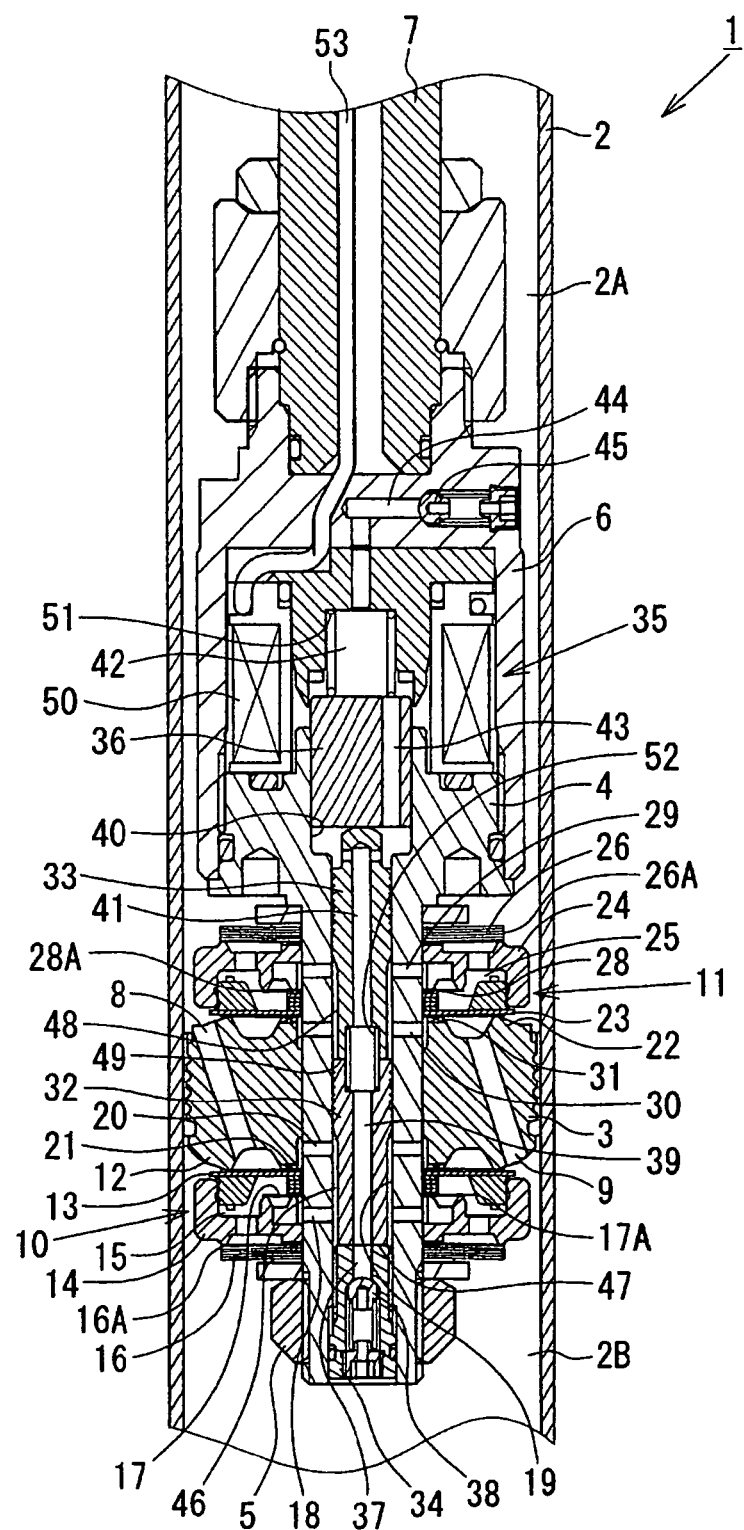
FIG. 1 is a vertical sectional view illustrating main parts of a damping force adjustable hydraulic shock absorber of an embodiment of the present invention.

As shown in FIG. 1, a damping force adjustable hydraulic shock absorber 1 (damping force adjustable fluid pressure shock absorber) of the present embodiment is a cylindrical hydraulic shock absorber. The damping force adjustable hydraulic shock absorber 1 comprises a cylinder 2 and a piston 3 slidably fitted in the cylinder 2. The inside of the cylinder 2 is divided by the piston 3 into two chambers, i.e., a cylinder upper chamber 2A and a cylinder lower chamber 2B. A distal end of a piston bolt 4 is inserted through the piston 3. The piston 3 is fixed to the distal end of the piston bolt 4 by a nut 5. A case 6 having a substantially bottomed cylindrical form is attached to a proximal end of the piston bolt 4 (upper portion of the piston bolt 4 in FIG. 1). One end of a piston rod 7 (lower portion of the piston rod 7 in FIG. 1) is coupled to a bottom of the case 6. The other end of the piston rod 7 is slidably and liquid-tightly inserted through a rod guide (not shown) and an oil seal (not shown) which are attached to an upper end of the cylinder 2, and extends to the outside of the cylinder 2.

A reservoir is connected to a lower end of the cylinder 2 through a base valve (not shown). Oil is sealed inside the cylinder 2 as fluid, and oil and a gas are sealed in the reservoir. In some embodiments, a free piston may be slidably fitted in a bottom side of the cylinder 2 so as to define a gas chamber, and a high-pressure gas may be sealed in the gas chamber.

The piston 3 includes an extension-side oil passage 8 open to the cylinder upper chamber 2A side, and a compression-side oil passage 9 open to the cylinder lower chamber 2B side. An extension-side damping valve 10 (damping force generating mechanism) for controlling an oil flow passing through the extension-side oil passage 8 is provided at a lower end of the piston 3. A compression-side damping valve 11 (damping force generating mechanism) for controlling an oil flow passing through the compression-side oil passage 9 is provided at an upper end of the piston 3.

The extension-side damping valve 10 comprises an extension-side main valve 13 (disk valve) and an extension-side backpressure chamber 15. The extension-side main valve 13 is seated on a seat portion 12 formed on a lower end face of the piston 3. The extension-side backpressure chamber 15 is defined at the back of the extension-side main valve 13 by a valve member 14 which is attached to the piston bolt 4 by the nut 5. An inner pressure in the extension-side backpressure chamber 15 acts on the extension-side main valve 13 in a valve-closing direction of the valve 13. A disk valve 16 having an orifice 16A (cutout) is provided at the valve member 14. The extension-side backpressure chamber 15 is connected to the cylinder lower chamber 2B through the disk valve 16. The extension-side backpressure chamber 15 and the lower cylinder chamber 2B are in constant communication with each other through the orifice 16A of the disk valve 16. When a pressure in the extension-side backpressure chamber 15 reaches a predetermined pressure, the disk valve 16 is opened, whereby the pressure is released into the lower cylinder chamber 2B.

The extension-side backpressure chamber 15 is connected to an oil passage 18 extending in a radial direction of the piston bolt 4 through a backpressure introducing valve 17 which is provided at the valve member 14. The radially extending oil passage 18 is also in communication with a guide bore 19 which extends along an axis of the piston bolt 4. The backpressure introducing valve 17 is a check valve which allows an oil flow from the radially extending oil passage 18 side to the extension-side backpressure chamber 15 side. The backpressure introducing valve 17 includes an orifice 17A through which the radially extending oil passage 18 and the extension-side backpressure chamber 15 are in constant communication with each other. The guide bore 19 is in communication with a radially extending oil passage 20. The radially extending oil passage 20 is connected to the extension-side oil passage 8 through an extension-side orifice 21 which is provided at the piston 3.

The compression-side damping valve 11 comprises an compression-side main valve 23 (disk valve) and a compression-side backpressure chamber 25. The compression-side main valve 23 is seated on a seat portion 22 formed on an upper end face of the piston 3. The compression-side backpressure-chamber 25 is defined at the back of the compression-side main valve 23 by a valve member 24 which is attached to the piston bolt 4 by the nut 5. An inner pressure in the compression-side backpressure chamber 25 acts on the compression-side main valve 23 in a valve-closing direction of the valve 23. A disk valve 26 having an orifice 26A (cutout) is provided at the valve member 24. The compression-side backpressure chamber 25 is connected to the cylinder upper chamber 2A through the disk valve 26. The compression-side backpressure chamber 25 and the cylinder upper chamber 2A are in constant communication with each other through the orifice 26A of the disk valve 26. When a pressure in the compression-side backpressure chamber 25 reaches a predetermined pressure, the disk valve 26 is opened, whereby the pressure is released into the cylinder upper chamber 2A.

The compression-side backpressure chamber 25 is connected to an oil passage 29 extending in a radial direction of the piston bolt 4 through a backpressure introducing valve 28 which is provided at the valve member 24. The radially extending oil passage 29 is open to the guide bore 19. The backpressure introducing valve 28 is a check valve which allows an oil flow from the radially extending oil passage 29 side to the compression-side backpressure chamber 25 side. The backpressure introducing valve 28 includes an orifice 28A through which the radially extending oil passage 29 and the compression-side backpressure chamber 25 are in constant communication with each other. Further, a radially extending oil passage 30 is provided through an side wall of the piston bolt 4. The radially extending oil passage 30 is connected to the compression-side oil passage 9 through a compression-side orifice 31 which is provided at the piston 3.

An extension-side valve body 32 (extension-side pressure control valve, first valve body) facing the radially extending oil passages 18 and 20, and a compression-side valve body 33 (compression-side pressure control valve, second valve body) facing the radially extending oil passages 29 and 30 are slidably fitted in the guide bore 19 of the piston bolt 4. A valve seat member 34 is screwed in the distal end of the piston bolt 4. A solenoid actuator 35 (damping force adjuster) is disposed inside the case 6. A front end of the extension-side valve body 32 abuts against a seat surface 34A of the valve seat member 34. A front end of the compression-side valve body 33 abuts against a seat surface 32A which is positioned at a back end of the extension-side valve body 32. A back end of the compression-side valve body 33 abuts against a plunger 36 of the solenoid actuator 35.

The valve seat member 34 includes an oil passage 37 in communication with the guide bore 19, and a check valve 38 (first check valve) which allows only an oil flow from the oil passage 37 to the cylinder lower chamber 2B. The extension-side valve body 32 includes a communication passage 39 which axially extends through the extension-side valve body 32 and communicates with the oil passage 37 of the valve seat member 34. The compression-side valve body 33 includes an oil passage 41. The oil passage 41 extends along an axis of the compression-side valve body 33. One end of the oil passage 41 is in communication with the communication passage 39 of the extension-side valve body 32. The other end of the oil passage 41 is in communication with the inside of a plunger bore 40 which guides the plunger 36. The plunger 36 includes an oil passage 43. The oil passage 43 extends in an axial direction of the plunger 36 and through the plunger 36. The plunger bore 40 and a chamber 42 inside the case 6 are in communication with each other through the oil passage 43. An oil passage 44 in communication with the chamber 42, and a check valve 45 (second check valve) which allows only an oil flow from the oil passage 44 to the cylinder upper chamber 2A are provided at the bottom of the case 6.

While the back end side of the extension-side valve body 32 is configured to be fitted in the guide bore 19, the front end side thereof has a smaller diameter than that of the back end side. By this configuration, an annular chamber 46 in communication with the radially extending passages 18 and 29 is defined between the front end side of the extension-side valve body 32 and a side wall of the guide bore 19. A pressure receiving surface which receives a pressure in the annular chamber 46 is formed on the front end side of the extension-side valve body 32. A seat surface 47 is formed at the front end of the extension-side valve body 32. When the seat surface 47 abuts against, i.e., is seated on the seat surface 34A of the valve seat member 34, the communication between the annular chamber 46 and the oil passage 37 of the valve seat member 34 is cut off. On the other hand, when the extension-side valve body 32 receives a pressure in the annular chamber 46 and the seat surface 47 moves away from the valve seat member 34, the communication between the annular chamber 46 and the oil passage 37 is established. In this way, the seat surface 47 serves as a valve. That is, the valve is closed when the seat surface 47 is seated on the seat surface 34A, while the valve is opened when the seat surface 47 is spaced away from the seat surface 34A.

While the back end side of the compression-side valve body 33 is configured to be fitted in the guide bore 19, the front end side thereof has a smaller diameter than that of the back end side. By this configuration, an annular chamber 48 in communication with the radially extending passages 29 and 30 is defined between the front end side of the compression-side valve body 33 and the side wall of the guide bore 19. A pressure receiving surface which receives a pressure in the annular chamber 48 is formed on the front end side of the compression-side valve body 33. A seat surface 49 is formed at the front end of the compression-side valve body 33. When the seat surface 49 abuts against, i.e., is seated on the seat surface 32A at the back end of the extension-side valve body 32, the communication between the annular chamber 48 and the oil passage 41 of the compression-side valve body 33 is cut off. On the other hand, when the compression-side valve body 33 receives a pressure in the annular chamber 48 and the seat surface 49 moves away from the seat surface 32A at the back end of the extension-side valve body 32, the communication between the annular chamber 48 and the oil passage 41 is established. In this way, the seat surface 49 serves as a valve. That is, the valve is closed when the seat surface 49 is seated on the seat surface 32A, while the valve is opened when the seat surface 49 is spaced away from the seat surface 32A.

The solenoid actuator 35 generates a thrust force acting on the plunger 36 according to a current applied to a coil 50, and pushes the extension-side and compression-side valve bodies 32 and 33 toward the valve seat member 34 side, thereby adjusting valve-opening pressures of these valves. A spring 51 biasing the plunger 36 toward the valve seat member 34 side is provided at the solenoid actuator 35. In addition, a spring 52 is interposed between the extension-side valve body 32 and the compression-side valve body 33. A lead wire 53 for applying a current to the coil 50 is inserted through the hollow piston rod 7, extending to the outside. A set load of the spring 51 can be adjusted by selecting how far the valve seat member 34 is screwed in.

Next, an operation of the present embodiment configured as described above will be discussed.

Figure 2:
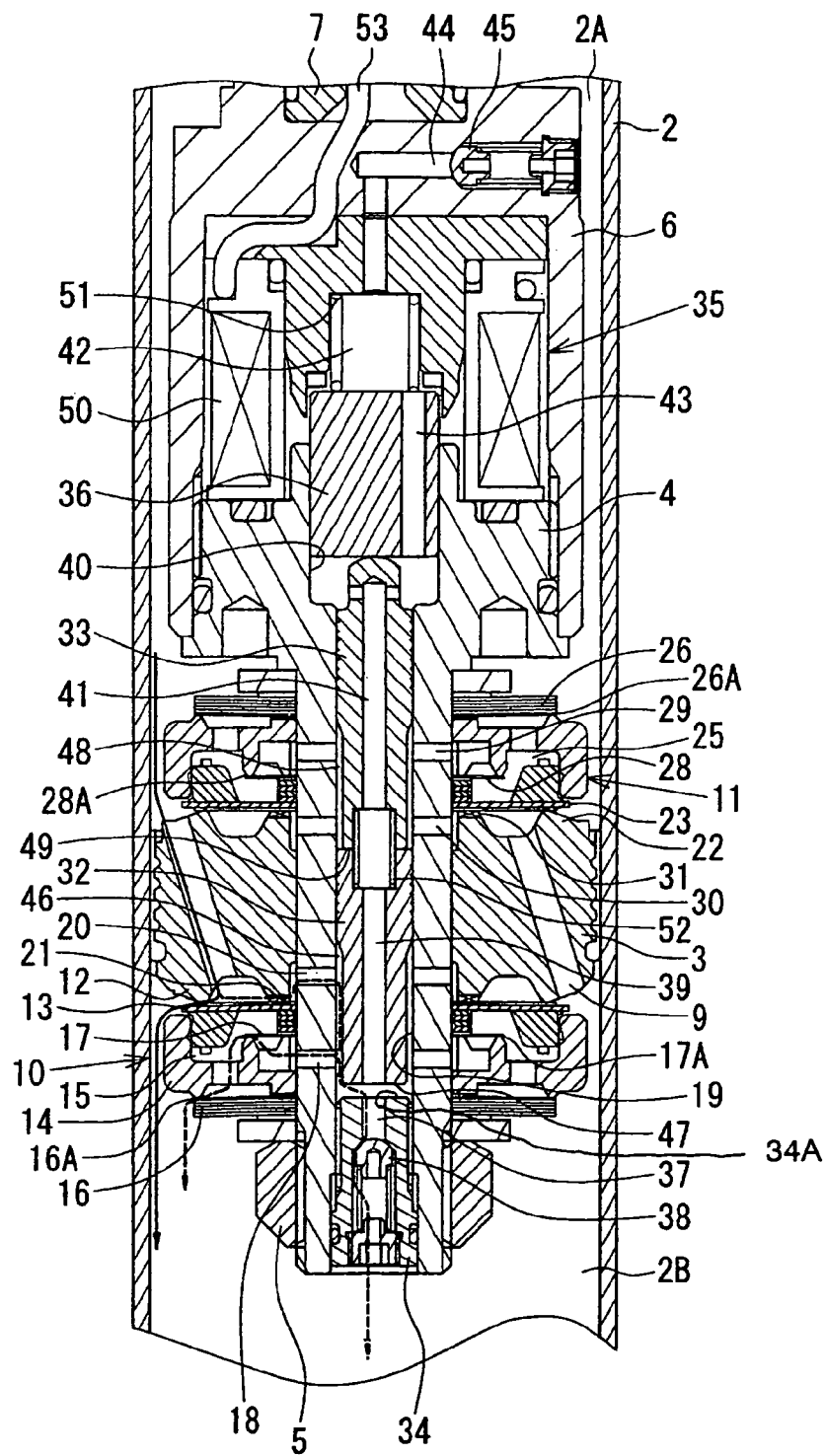
FIG. 2 illustrates an oil flow during an extension stroke of a piston rod in the damping force adjustable hydraulic shock absorber shown in FIG. 1.

During an extension stroke of the piston rod 7, until the extension-side main valve 13 is opened, oil in the cylinder upper chamber 2A side flows into the cylinder lower chamber 2B through the extension-side oil passage 8, the extension-side orifice 21, the radially extending oil passage 20, the annular chamber 46, the radially extending oil passage 18, the backpressure introducing valve 17, the extension-side backpressure chamber 15 and the orifice 16A, as indicated by a broken line in FIG. 2 (extension-side bypass flow passage). In addition, the extension-side valve body 32 is opened by the oil flowing through the annular chamber 46, and therefore the oil flows from the annular chamber 46 into the cylinder lower chamber 2B through the oil passage 37 and the check valve 38. Once the pressure in the cylinder upper chamber 2A side reaches the valve-opening pressure of the extension-side main valve 13, the valve 13 is opened and then the oil starts to flow from the extension-side oil passage 8 into the cylinder lower chamber 2B directly, as indicated by a solid line in FIG. 2 (extension-side flow passage). It should be noted that, during the above-mentioned extension stroke, a change in volume inside the cylinder 2 due to exit of the piston rod 7 from the cylinder 2 is compensated for by expansion of the gas in the reservoir or the gas chamber.

Controlling a current to be applied to the coil 50 of the solenoid actuator 35 enables adjustment of the valve-opening pressure of the extension-side valve body 32. This adjustment enables direct control of an oil flow from the annular chamber 46 to the oil passage 37, whereby it becomes possible to adjust the damping force. At the same time, since controlling an oil flow from the chamber 46 to the passage 37 enables adjustment of a pressure of oil introduced from the annular chamber 46 to the extension-side backpressure chamber 15, it becomes possible to control the valve-opening pressure of the extension-side main valve 13.

When the extension-side valve body 32 is opened, the back end of the compression-side valve body 33 protrudes into the plunger bore 40 of the solenoid actuator 35. At this time, the oil in the plunger bore 40 flows into the cylinder lower chamber 2B, which is on the low pressure side, through the oil passage 41 of the compression-side valve body 33, the communication passage 39 of the extension-side valve body 32, the oil passage 37 of the valve seat member 34 and the check valve 38. In this way, an amount of oil corresponding to the protrusion of the compression-side valve body 33 can be accommodated, whereby the extension-side valve body 32 can be smoothly opened and responsiveness of the hydraulic absorber can be enhanced.

Figure 3:
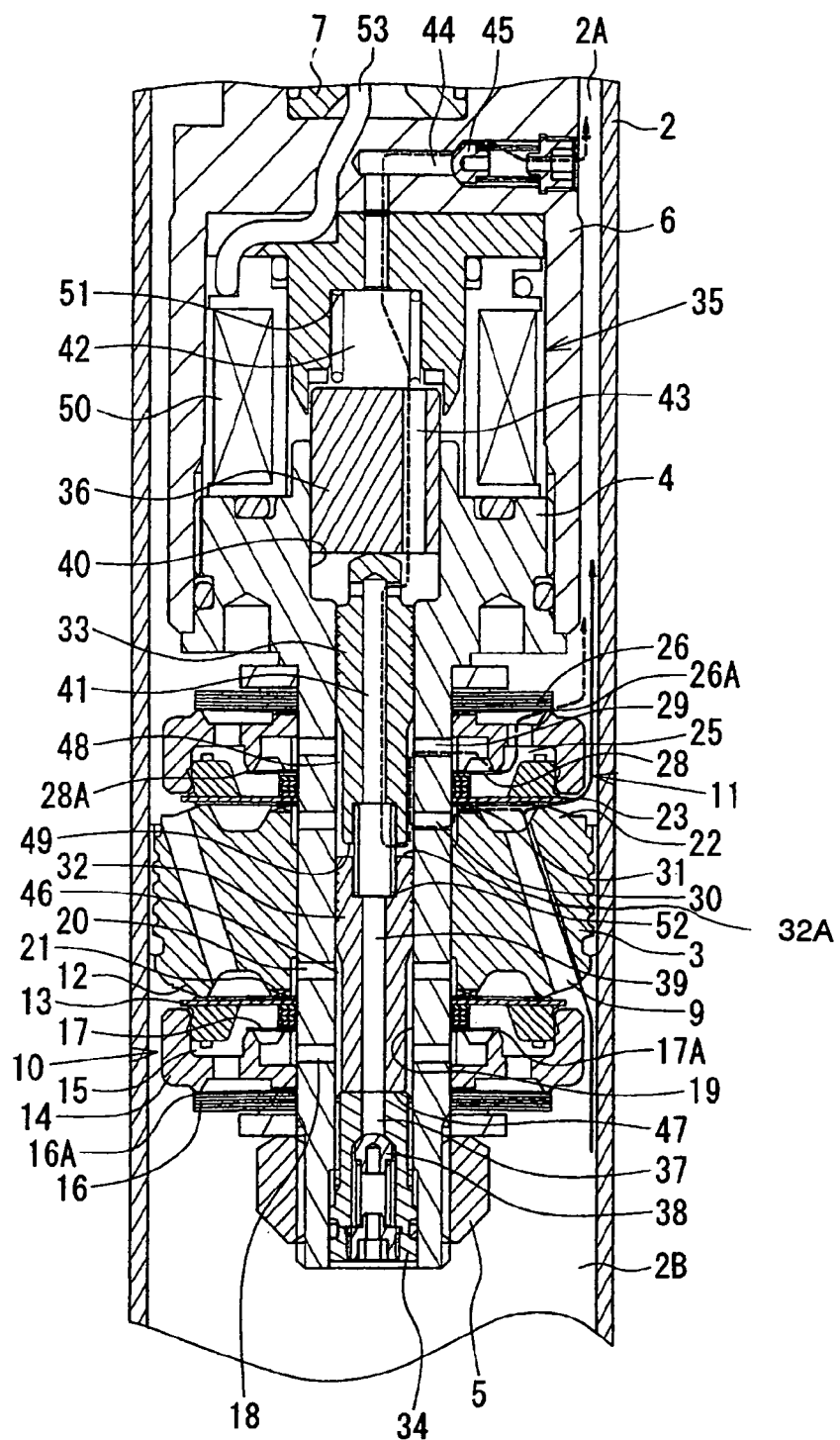
FIG. 3 illustrates an oil flow during a compression stroke of a piston rod in the damping force adjustable hydraulic shock absorber shown in FIG. 1.

During a compression stroke of the piston rod 7, until the compression-side main valve 23 is opened, oil in the cylinder lower chamber 2B side flows into the cylinder upper chamber 2A through the compression-side oil passage 9, the compression-side orifice 31, the radially extending oil passage 30, the annular chamber 48, the radially extending oil passage 29, the backpressure introducing valve 28, the compression-side backpressure chamber 25 and the orifice 26A, as indicated by a broken line in FIG. 3 (compression-side bypass flow passage). In addition, the compression-side valve body 33 is opened by the oil flowing through the annular chamber 48, and therefore the Oil flows from the annular chamber 48 into the cylinder upper chamber 2A through the oil passage 41 and the plunger bore 40, the oil passage 43 of the plunger 36, the oil passage 44 of the case 6 and the check valve 45. Once the pressure in the cylinder lower chamber 2B side reaches the valve-opening pressure of the compression-side main valve 23, the valve 23 is opened and then the oil starts to flow from the compression-side oil passage 9 into the cylinder upper chamber 2A directly, as indicated by a solid line in FIG. 3 (compression-side flow passage). It should be noted that, during the above-mentioned compression stroke, a change in volume inside the cylinder 2 due to entry of the piston rod 7 into the cylinder 2 is compensated for by compression of the gas in the reservoir or the gas chamber.

Controlling a current to be applied to the coil 50 of the solenoid actuator 35 enables adjustment of the valve-opening pressure of the compression-side valve body 33. This adjustment enables direct control of an oil flow from the annular chamber 48 to the oil passage 41, whereby it becomes possible to adjust the damping force. At the same time, since controlling the oil flow from the chamber 48 to the passage 41 enables adjustment of a pressure of oil introduced from the annular chamber 48 to the compression-side backpressure chamber 25, it becomes possible to control the valve-opening pressure of the compression-side main valve 23.

When the compression-side valve body 33 is opened, the back end of the compression-side valve body 33 protrudes into the plunger bore 40 of the solenoid actuator 35. At this time, the oil in the plunger bore 40 flows into the cylinder upper chamber 2A, which is on the low pressure side, through the oil passage 43 of the plunger 36, the oil passage 44 of the case 6 and the check valve 45. In this way, an amount of oil corresponding to the protrusion of the compression-side valve body 33 can be accommodated, whereby the compression-side valve body 33 can be smoothly opened and responsiveness of the hydraulic absorber can be enhanced.

In this way, it is possible to adjust the valve-opening pressures of the extension-side and compression-side valve bodies 32 and 33 by use of the common solenoid actuator 35, and at the same time, it is possible to adjust the valve-opening pressures of the extension-side and compression-side main valves 13 and 23 by utilizing the inner pressures in the extension-side and compression-side backpressure chambers 15 and 25. As a result, it becomes possible to realize a simple structure while increasing an adjustable range of damping forces.

According to the damping force adjustable fluid pressure shock absorber of the present embodiment, it is possible to, by adjusting the valve-opening pressures of the extension-side and compression-side pressure control valves by use of the damping force adjuster, control flows of fluid passing through the extension-side and compression-side bypass flow passages, and thereby to adjust the damping force; at the same time, it is possible to adjust the valve-opening pressures of the extension-side and compression-side main valves by adjusting pressures of fluid introduced into the extension-side and compression-side backpressure chambers. When the first or second valve of the extension-side or compression-side pressure control valve is opened, fluid is discharged from the guide bore into either of the two chambers in the cylinder through the communication passages and the first or second check valve. Therefore, it is possible to move the first and second valve bodies smoothly, and to enhance responsiveness of the fluid pressure shock absorber.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2007-94803, filed on Mar. 30, 2007.

The entire disclosure of Japanese Patent Application No. 2007-94803 filed on Mar. 30, 2007 including specification, claims, drawings and summary is incorporated herein by reference in its entirety.

What is claimed is:

1. A damping force adjustable fluid pressure shock absorber, comprising:
a cylinder in which a fluid is sealingly contained;
a piston slidably fitted in the cylinder so as to divide an inside of the cylinder into two chambers;
a piston rod coupled to the piston and extending to an outside of the cylinder;
an extension-side flow passage and a compression-side flow passage through which the two chambers in the cylinder are in communication with each other; and
a damping force generating mechanism for generating a damping force by controlling fluid flows in the extension-side flow passage and the compression-side flow passage,
wherein the damping force generating mechanism comprises:
an extension-side main valve provided at the extension-side flow passage,
an extension-side backpressure chamber for adjusting a valve-opening pressure of the extension-side main valve,
an extension-side bypass flow passage through which the two chambers in the cylinder are in communication with each other,
an extension-side presure control valve provided at the extension-side bypass flow passage and adapted to be opened by receiving a pressure in the extension-side bypass flow passage,
a compression-side main valve provided at the compression-side flow passage,
a compression-side backpressure chamber for adjusting a valve-opening pressure of the compression-side main valve,
a compression-side bypass flow passage through which the two chambers in the cylinder are in communication with each other, and
a compression-side pressure control valve provided at the compression-side bypass flow passage and adapted to be opened by receiving a pressure in the compression-side bypass flow passage,
the extension-side bypass flow passage introducing a pressure of an upstream side of the extension-side pressure control valve into the extension-side backpressure chamber,
the compression-side bypass flow passage introducing a pressure of an upstream side of the compression-side pressure control valve into the compression-side backpressure chamber,
the extension-side pressure control valve and the compression-side pressure control valve comprising:
a guide bore shared by the two valves, the guide bore having one end in communication with one of the two chambers in the cylinder and an opposite end in communication with the other of the two chambers in the cylinder,
a first valve body slidably fitted in the guide bore, and adapted to be seated on a seat surface provided in the guide bore and to be opened by receiving a pressure in one of the extension-side bypass flow passage and the compression-side bypass flow passage,
a second valve body slidably fitted in the guide bore, and adapted to be seated on a seat surface provided at the first valve body and to be opened by receiving a pressure in the other of the extension-side bypass flow passage and the compression-side bypass flow passage,
a damping force adjuster for adjusting valve-opening pressures of the first valve body and the second valve body by biasing the first valve body and the second valve body in valve-closing directions thereof,
a first check valve provided at the one end of the guide bore, and allowing only a fluid flow from one end side of the first valve body and the second valve body to the one of the two chambers in the cylinder, and
a second check valve provided at the opposite end of the guide bore, and allowing only a fluid flow from an opposite end side of the first valve body and the second valve body to the other of the two chambers in the cylinder, and
an axially extending communication passage provided through the first valve body and the second valve body, the axially extending communication passage allowing communication between the one end side of the first valve body and the second valve body, and the opposite end side of the first valve body and the second valve body.

2. The damping force adjustable fluid pressure shock absorber according to claim 1, wherein the damping force adjuster comprises a proportional solenoid actuator.

3. The damping force adjustable fluid pressure shock absorber according to claim 2, further comprising a biasing unit provided between the valve bodies for biasing the first valve body and the second valve body in a direction in which the valve bodies are spaced apart from each other.

4. The damping force adjustable fluid pressure shock absorber according to claim 2, wherein:
the first valve body includes a small diameter portion on one end side thereof, the small diameter portion adapted to be seated on the seat surface provided in the guide bore, and a large diameter portion on an opposite end side thereof, the large diameter portion adapted to be guided by the guide bore; and
the second valve body includes a small diameter portion on one end side thereof, the small diameter portion adapted to be seated on the seat surface provided at the first valve body, and a large diameter portion on an opposite end side thereof, the large diameter portion adapted to be guided by the guide bore.

5. The damping force adjustable fluid pressure shock absorber according to claim 2, further comprising a valve seat member provided in the guide bore so as to be axially movable, the valve seat member including an end surface serving as the seat surface which abuts against the first valve body.

6. The damping force adjustable fluid pressure shock absorber according to claim 5, wherein one of the first check valve and the second check valve is provided in the valve seat member.

7. The damping force adjustable fluid pressure shock absorber according to claim 2, wherein the guide bore extends in an axial direction of the piston rod.

8. The damping force adjustable fluid pressure shock absorber according to claim 1, further comprising a biasing unit provided between the valve bodies for biasing the first valve body and the second valve body in a direction in which the valve bodies are spaced apart from each other.

9. The damping force adjustable fluid pressure shock absorber according to claim 8, wherein:
the first valve body includes a small diameter portion on one end side thereof, the small diameter portion adapted to be seated on the seat surface provided in the guide bore, and a large diameter portion on an opposite end side thereof, the large diameter portion adapted to be guided by the guide bore; and
the second valve body includes a small diameter portion on one end side thereof, the small diameter portion adapted to be seated on the seat surface provided at the first valve body, and a large diameter portion on an opposite end side thereof, the large diameter portion adapted to be guided by the guide bore.

10. The damping force adjustable fluid pressure shock absorber according to claim 8, further comprising a valve seat member provided in the guide bore so as to be axially movable, the valve seat member including an end surface serving as the seat surface which abuts against the first valve body.

11. The damping force adjustable fluid pressure shock absorber according to claim 10, wherein one of the first check valve and the second check valve is provided in the valve seat member.

12. The damping force adjustable fluid pressure shock absorber according to claim 8, wherein the guide bore extends in an axial direction of the piston rod.

13. The damping force adjustable fluid pressure shock absorber according to claim 1, wherein:
the first valve body includes a small diameter portion on one end side thereof, the small diameter portion adapted to be seated on the seat surface provided in the guide bore, and a large diameter portion on an opposite end side thereof, the large diameter portion adapted to be guided by the guide bore; and
the second valve body includes a small diameter portion on one end side thereof, the small diameter portion adapted to be seated on the seat surface provided at the first valve body, and a large diameter portion on an opposite end side thereof, the large diameter portion adapted to be guided by the guide bore.

14. The damping force adjustable fluid pressure shock absorber according to claim 13, further comprising a valve seat member provided in the guide bore so as to be axially movable, the valve seat member including an end surface serving as the seat surface which abuts against the first valve body.

15. The damping force adjustable fluid pressure shock absorber according to claim 14, wherein one of the first check valve and the second check valve is provided in the valve seat member.

16. The damping force adjustable fluid pressure: shock absorber according to claim 13, wherein the guide bore extends in an axial direction of the piston rod.

17. The damping force adjustable fluid pressure shock absorber according to claim 1, further comprising a valve seat member provided in the guide bore so as to be axially movable, the valve seat member including an end surface serving as the seat surface which abuts against the first valve body.

18. The damping force adjustable fluid pressure shock absorber according to claim 17, wherein one of the first check valve and the second check valve is provided in the valve seat member.

19. The damping force adjustable fluid pressure shock absorber according to claim 17, wherein the guide bore extends in an axial direction of the piston rod.

20. The damping force adjustable fluid pressure shock absorber according to claim 1, wherein the guide bore extends in an axial direction of the piston rod.

* * * * *